July 22, 1969                    J. J. NASH                    3,456,552
                          ROCKET LAUNCHER FAIRINGS
Filed April 20, 1967                                        3 Sheets-Sheet 1

Inventor
JOHN J. NASH
By John D. Pope III
   Attorney

July 22, 1969          J. J. NASH          3,456,552
ROCKET LAUNCHER FAIRINGS
Filed April 20, 1967          3 Sheets-Sheet 2

Inventor
JOHN J. NASH
By John D. Pope III
Attorney

July 22, 1969  J. J. NASH  3,456,552
ROCKET LAUNCHER FAIRINGS
Filed April 20, 1967  3 Sheets-Sheet 3

Inventor
JOHN J. NASH
By John D. Pope III
Attorney

United States Patent Office 3,456,552
Patented July 22, 1969

3,456,552
ROCKET LAUNCHER FAIRINGS
John J. Nash, Ferguson, Mo., assignor to Alsco Inc., St. Louis, Mo., a corporation of Delaware
Filed Apr. 20, 1967, Ser. No. 632,441
Int. Cl. F41f 3/06
U.S. Cl. 89—1.817                                    7 Claims

ABSTRACT OF THE DISCLOSURE

A rocket launcher provided with a permanent nose fairing cast from aluminum and having a gently contoured forwardly tapered outer surface. Bores and outwardly opening counterbores are formed in the casting and register with the rocket tubes of the launcher. Polyurethane plugs are fitted within the counterbores to protect the rockets from the surrounding environment. A tail fairing having an arcuately tapered skirt is fitted onto the aft end of the launcher body. The skirt tapers rearwardly and terminates at a diametrally reduced discharge mouth. This construction channels the blast and debris issuing from an ignited rocket into a straight-flowing jet stream so that the debris avoids the fuselage and tail empennage of the firing aircraft.

---

This invention relates in general to rocket launchers and, more particularly, to nose and tail fairings for rocket launchers.

It is common practice to arm military aircraft with rockets and these rockets are generally clustered in rocket launchers suspended from the aircraft wings or fuselage. Broadly speaking, each rocket launcher possesses a plurality of parallel axially extending rocket launching tubes having suitable electrical contacts therein for connecting the rockets with the aircraft's power supply through a firing switch located in the cockpit. In order to protect the rockets during the course of the aircraft's flight to its target and further to reduce drag on the aircraft itself, gently contoured nose cones or fairings are utilized which attach to and completely cover the forward end of the launcher body. Nose fairings of current manufacture are primarily fabricated from frangible synthetic resins. Consequently, when the first rocket ignites and emerges from the launcher body, the fairing shatters into a multitude of fragments. Thereafter, the remaining rockets are exposed and remain unprotected for the duration of the flight. Moreover, a new nose cone must be provided at the beginning of each mission for the launchers which discharged rockets during the previous mission. This is not only unduly expensive, but further presents logistic problems. Moreover, the multitude of cone fragments resulting from the fragmentation of frangible fairings in flight present a hazard for trailing aircraft and further often impinge against and damage the fuselage, wings, and tail empennage of the firing aircraft itself. Inasmuch as such fragments possess jagged edges and travel at high velocities in erratic paths, a very serious aeronautical hazard is presented.

Similarly, tail fairings for such rocket launchers are also fabricated from frangible material which fragmentize when the first rocket ignites, thereby compounding the problems previously discussed. In addition, the rocket blast often contains solid fragments, electrical connector elements and other debris all of which travel at high velocities and in erratic paths. This debris issues from the rocket launcher each time a rocket is fired and although it does not present much of a danger to the wings of the aircraft, it often impinges against the rear fuselage and tail empennage as well as trailing aircraft.

Among the several objects of the present invention may be noted the provision of nose and tail fairings for rocket launchers which are permanent in nature and capable of withstanding numerous rocket launchings; the provision of a nose fairing which protects the rockets from the surrounding environment but does not eject fragments capable of damaging the firing aircraft itself or a trailing aircraft when the rockets are fired; the provision of a tail fairing which channels the rearward moving debris resulting from the ignition of rockets into a substantially straight-flowing jet stream; and the provision of nose and tail fairings which are simple in construction, durable, and relatively inexpensive. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated:

Corresponding reference characters indicate corresponding parts throughout the several views of the drawings.

Figure 1:
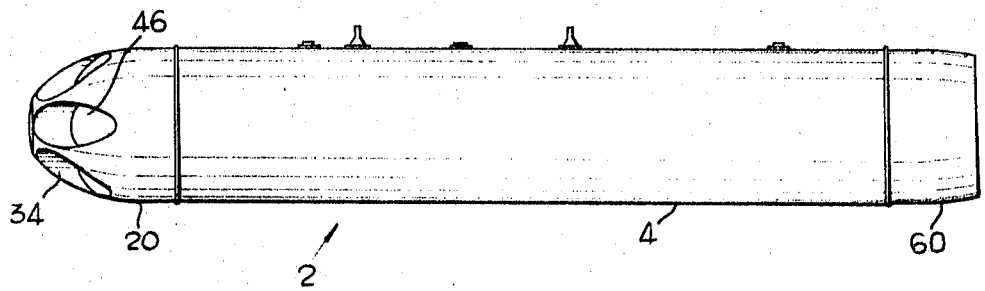
FIG. 1 is a side elevational view of a rocket launcher having nose and tail fairings constructed in accordance with and embodying the present invention.
Figure 2:
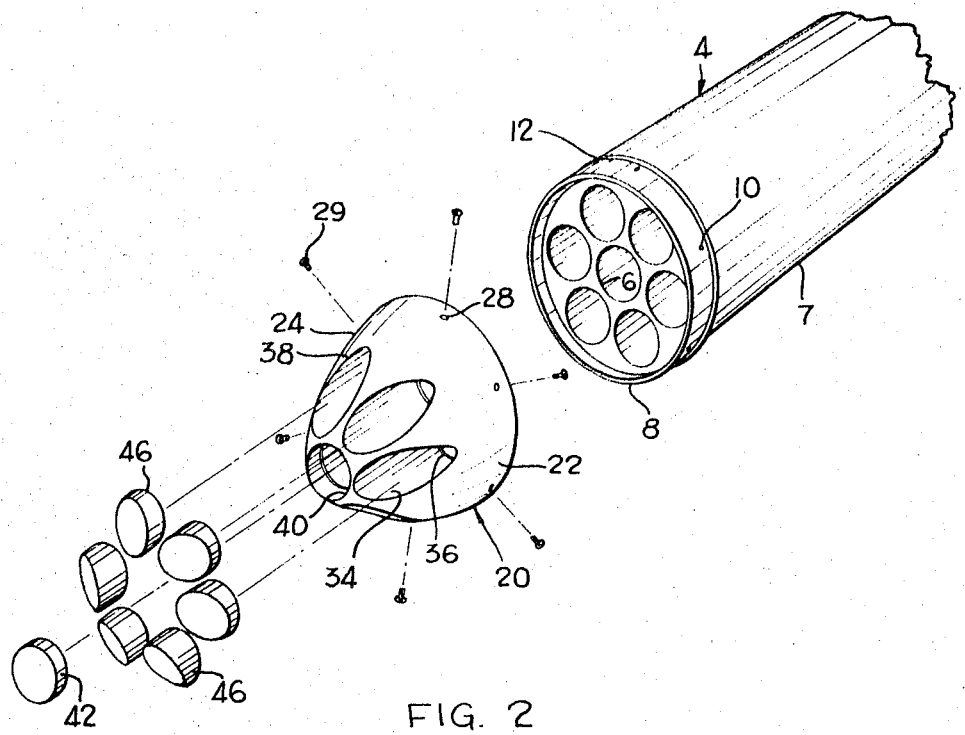
FIG. 2 is an exploded perspective view of a nose fairing and launcher body.
Figure 6:
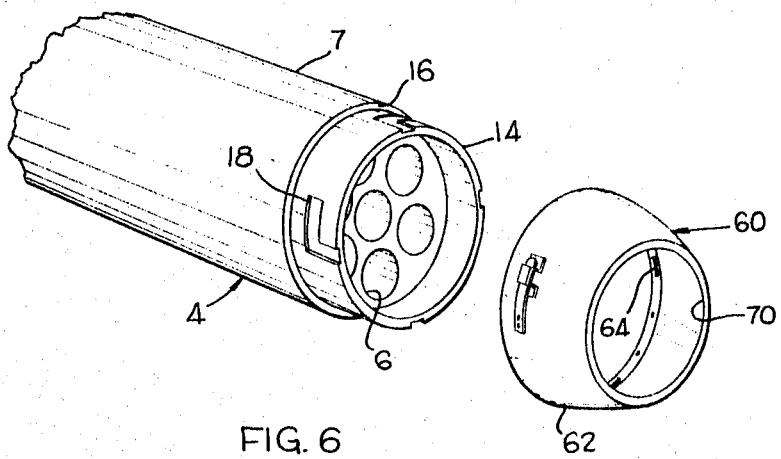
FIG. 6 is an exploded perspective view of the tail fairing and launcher body.

Referring now to the drawings, 2 designates a rocket launcher having a body section 4 provided with a cluster of seven axially extendnig rocket tubes 6 and surrounded by a cylindrical skin 7. The axis of one of tubes 6 is coincident with the axis of skin 7 while the remaining tubes 6 are disposed about it in circumferentially spaced relation. At its forward end body section 4 is provided with an axially protruding forward mounting rim 8 having a plurality of circumferentially spaced radially extending threaded apertures 10. The outer cylindrical surface of rim 8 inwardly terminates at a shoulder 12 and is slightly less in diameter than skin 7. At its opposite or aft end body section 4 (FIG. 6) is provided with another mounting rim 14 having a diametrally reduced outer surface which inwardly terminates at a rear shoulder 16. Milled into aft mounting rim 14 are a plurality of outwardly opening bayonet slots 18.

Body section 4, skin 7, tubes 6, rims 8, 14, as well as the remaining structural portions of launcher 2 are preferably constructed from a light-weight durable metal such as aluminum, as described in my copending application Ser. No. 425,773, filed Jan. 15, 1965.

Attached to and carried by forward mounting rim 8 is a nose fairing 20 which is preferably cast from a durable lightweight metal such as aluminum and integrally includes an outer wall 22 having a gently contoured arcuately tapered outer surface 24. At its rear end, wall 22 is of sufficient axial length to accommodate rim 8 in its screws 29 for holding nose fairing 20 securely on body section cludes an outer wall surface 24. At its rear end, wall 22 is slightly relieved in the provision of a shallow recess 26 sized for snug fitting reception of rim 8. Recess 26 is of sufficient axial length to accommodate rim 8 in its entirety so that the circular rear edge of outer wall 22 abuts against shoulder 12, at which point surface 24 is flush with skin 7. In close proximity to shoulder 12 outer wall 22 is provided with a plurality of circumferentially spaced countersunk apertures 28 which register with threaded apertures 10 in rim 8 and accept machine screws 29 for holding nose fairing 20 securely on body section 4.

Nose fairing 20 is internally provided with an integrally cast honeycomb segment 30 having seven axially extending parallel bores 32, the rear margins of which register with and are located in close proximity to the forward margins of tubes 6. Bores 32 at their opposite or forward ends open into counterbores 34 at annular shoulders 36. Counterbores 34 in turn extend through wall 22 and with the exception of the center counterbore 34, they intersect outer surface 24 at somewhat elliptical or elongated forward margins 38. Center counterbore 34, on the other hand, forwardly terminates at a circular margin 40. Thus, bores 32 and counterbores 34 form continuous rocket discharge channels.

Fitted snugly into the center counterbore 34 is a cylindrical plug 42 having a planar squared-off rear face which abuts against shoulder 36 and a dome-shaped forward face 44 which is located substantially flush with circular margin 40. Similarly fitted within the encircling circumferentially spaced counterbores 34 are outer plugs 46 also having planar squared-off rear faces which abut against shoulders 36 and beveled forward faces 48 which are set somewhat inwardly from the elliptical forward margins 38 of the circumferentially spaced counterbores 34. Plugs 42, 46, are preferably formed from a soft lightweight cellular material such as foamed polyurethane and forward faces 44, 48, thereof are coated with a protective fire-resistant coating.

Attached to and carried by aft mounting rim 14 (FIGS. 6 and 8), is a tail fairing 60 including an arcuately tapered skirt 62, the forward enlarged end of which fits snugly over mounting rim 14 and into abutment with shoulder 16 where its outer surface is substantially flush with the outer surface of skin 7. Riveted or otherwise firmly secured to the inwardly presented surface of skirt 62 are plurality of circumferentially spaced lugs 64 which register with and fit within the axial portions of bayonet slots 18. When the forward end margin of skirt 62 abuts against shoulder 16 it is possible to rotate skirt 62 slightly and thereby move lugs 64 into the circumferentially extending portions of slots 18 so as to preclude axial withdrawal of skirt 62 from body section 4. Fitted into skirt 62 in circumferential alignment with and in close proximity to one of lugs 64 is a locking pin 66 which is urged inwardly by means of a spring 68. Pin 66 is spaced from its adjacent lug 64 a distance slightly less than the arcuate length of the circumferential portion of bayonet slot 18 so that when the adjacent lug 64 is disposed within the blind end of a slot 18, pin 66 will project into the opposite end of that slot 18 and prevent reverse rotation of skirt 62. Skirt 62 is formed from a durable metal such as aluminum, and as previously noted possesses a slight arcuate taper which terminates at a diametrally reduced discharge mouth 70.

Figures 3, 4:
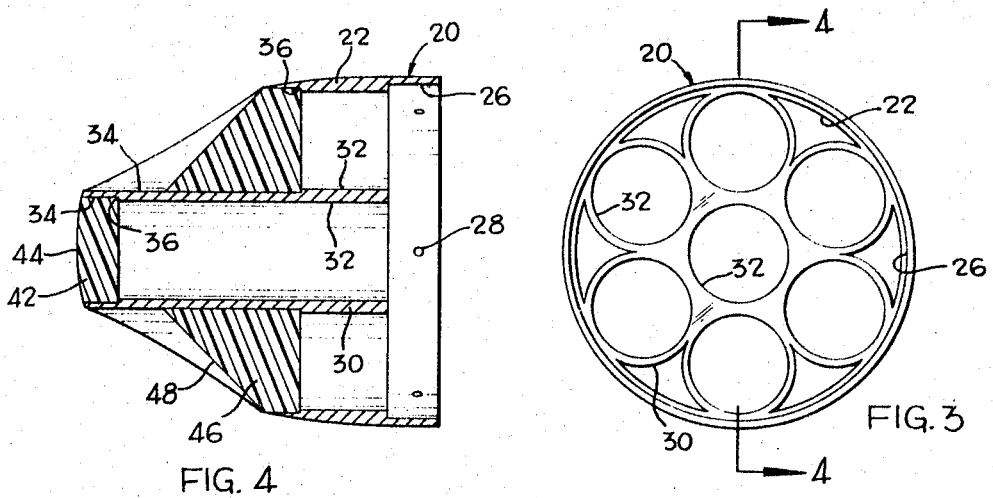
FIG. 3 is a rear elevational view of the nose fairing.
FIG. 4 is a sectional view taken along line 4—4 of FIG. 3.
Figures 5, 7:
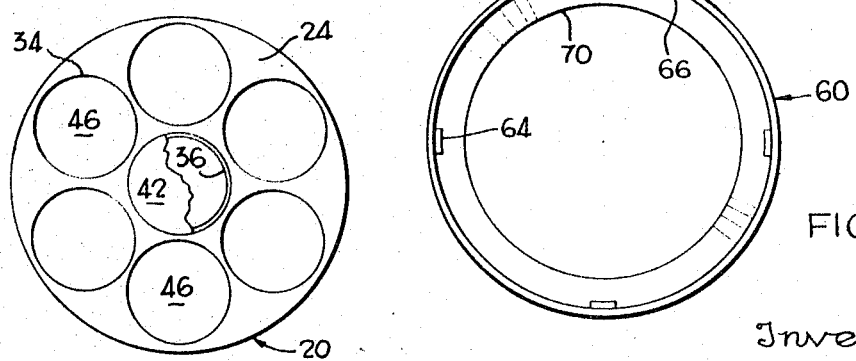
FIG. 5 is a front elevational view of the nose fairing.
FIG. 7 is a rear elevational view of the tail fairing.

In use rocket launcher 2 is suspended from the wing or fuselage of an aircraft in the conventional manner and its firing circuit is connected by means of a conventional plug arrangement to the firing circuit of the aircraft. Thereafter, ordnance personnel insert rockets through bores 32 of nose fairing 20 and into their corresponding tubes 6 of body section 4 until the centrally disposed contactor plates at the rear of the rockets abut against the tail contacts within tubes 6. When the contactor plate of each rocket engages its corresponding tail contact, a spring detent within the particular tube 6 will engage a latching rim on the rocket and thereby positively retain the rocket within tube 6 until it is ignited. The foregoing rocket and launcher tube construction forms no part of the present invention and is described in more detail in my copending application Ser. No. 425,773, filed Jan. 15, 1965. Next, plugs 42, 46, are inserted into the center and surrounding counterbores 34, respectively, until they abut against shoulders 36. In this connection, it should be noted that plugs 46 are fitted so that beveled faces 48 thereof taper outwardly. In this position beveled faces 48 are set somewhat inwardly from elongated margins 38, but still approximately conform with the taper of outer surface 24 on wall 22 (FIG. 4).

When the firing switch within the cockpit is depressed one of the rockets will ignite and advance forwardly within its tube 6. The nose of the rocket will enter the corresponding bore 32, engage the squared-off planar face of plug 42 or 46 therein, and urge that plug outwardly. Inasmuch as plugs 42, 46, are formed from foamed polyurethane, they present no hazard whatsoever to the skin of the aircraft or of the trailing aircraft once they are ejected from their counterbores 34. Since plugs 42, 46, are coated on the forward faces with a fire-resistant coating, the blast issuing from the ignited rocket once it leaves its tube 6 and bore 32 does not harm those plugs 42, 46, remaining in nose fairing 20. In view of the fact that nose fairing 20 does not shatter into a multitude of jagged fragments as do conventional frangible fairings, it presents no hazard to the firing aircraft or to trailing aircraft and furthermore can be used practically indefinitely. Consequently, the aircraft carrier or air base from which the aircraft are launched need not keep a large supply of bulky frangible fairings on hand. All that need be stockpiled are plugs 42, 46, and they are light in weight and consume relatively little space. It is also significant to note that each rocket remains protected from the surrounding environment by plugs 42, 46, until it is actually fired. This is not true of conventional frangible fairings which expose all the rockets within the launcher cluster after one rocket has been fired. As a result the rockets last in the firing order of conventional launchers are subjected to the blast and flames issuing from the preceding rockets, not to speak of the fragments resulting from the shattering of the frangible fairing.

By reason of the tapered configuration of skirt 62 and reduced size of discharge mouth 70, the blast or jet issuing from an ignited rocket will be channeled into a confined jet stream which flows rearwardly in a substantially axial line. Accordingly, the solid particles of propellant, as well as the electrical contactor components and other debris, will be entrained within the jet stream and thereby completely clear the fuselage and tail empennage of the aircraft. Moreover, tail fairings 60, being formed from aluminum, is not fragmentized by the blast of the rocket. On the contrary, it remains intact and can be used for numerous missions.

Figure 8:
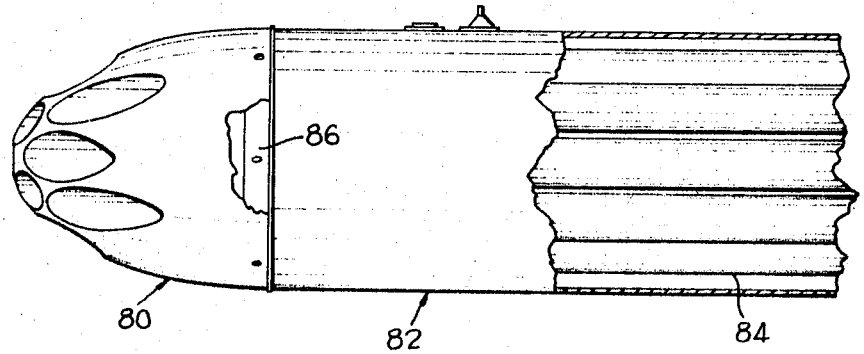
FIG. 8 is a fragmentary side elevational view of a rocket launcher having a modified nose fairing constructed in accordance with and embodying the present invention.
Figure 9:
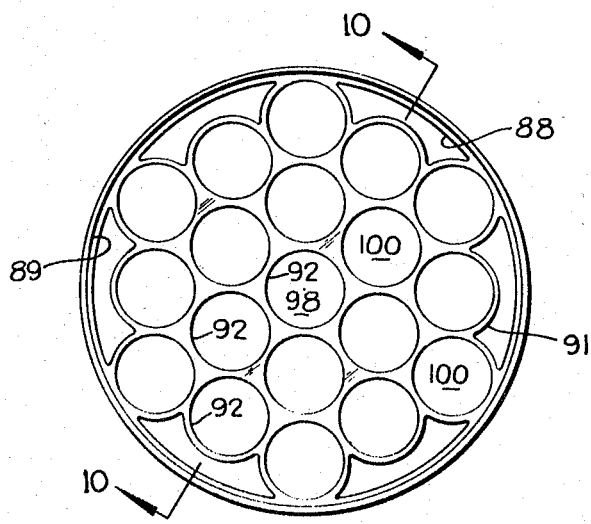
FIG. 9 is a rear elevational view of the modified nose fairing.
Figure 10:
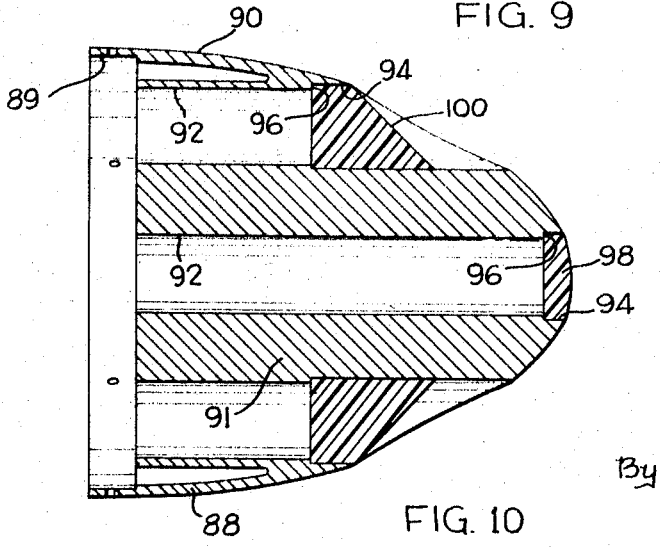
FIG. 10 is a sectional view taken along line 10—10 of FIG. 9.

Referring now to FIGS. 8–10, it is possible to provide a modified nose fairing 80 for use on a launcher body section 82 having a cluster of nineteen rocket tubes 84 arranged in three concentric circles of six tubes 84, each about the center tube 84 in the configuration illustrated in FIG. 9. Body section 82 is provided with a forward mounting rim 86 to which nose fairing 80 is attached in the manner previously described.

Nose fairing 80 includes an outer wall 88 having a forwardly tapered gently contoured outer surface 90 and a shallow recess 89 which snugly accepts mounting rim 86. Cast integrally with wall 88 is an internal honeycomb segment 91 having nineteen bores 92 which marginally register with tubes 84. Bores 92 open outwardly into counterbores 94 at shoulders 96. Fitted into the center of counterbores 94 and against its shoulder 96 is a domed plug 98 and similarly fitted against shoulders 96 of the remaining encircling counterbores 94 are beveled plugs 100, all of which are beveled at substantially the same angle. With the exception of the arrangement of bores 92 and counterbores 94, fairing 80 is very similar to fairing 20. Nose fairings can be constructed in accordance with the present invention in different cluster patterns and numbers of bores.

In view of the above, it will be seen that the several objects of the invention are achieved and other advantageous results attained.

As various changes could be made in the above constructions without departing from the scope of the invention, it is intended that all matter contained in the above descripion or shown in the accompanying drawings shall be interpreted as illustrative and not in a limiting sense.

I claim:

1. In a rocket launcher having a body section provided with a plurality of axially extending parallel launcher tubes arranged in a circular pattern about the axial centerline of the body section and in which each tube is adapted to contain and launch rockets; the improvement comprising a nose fairing attached to and projecting beyond the forward end of the launcher body and having a forwardly tapered outer surface, the fairing being provided with a plurality of coaxial bores and counterbores which in combination pass through it in the formation of rocket discharge channels; the bores terminating adjacent to and in registration with the forward ends of the launcher tubes and forwardly opening into the counterbores at annular shoulders; the counterbores opening outwardly at their forward ends through the tapered outer surface of the body section; and plugs fitted rearwardly into the counterbores and against the annular shoulders for protecting the rockets in the launcher tubes, the plugs having beveled faces inclined in substantially the same direction as the tapered outer surface of the fairing at a location where that plug's counterbore opens outwardly through the outer surface so as to deflect the oncoming airstream outwardly; one of the bores being a centerbore having a center counterbore, the axial centerlines of which are located coincident with the axial centerline of the nose fairing and launcher; one of the plugs being a center plug fitted into the center counterbore and against the center shoulder.

2. A device according to claim 1 wherein the center plug includes a cylindrical outer surface which snugly but slidably engages the cylindrical surface of the counterbore, the center plug's leading edge formed by the intersection of its forward face and cylindrical outer surface being adjacent the forward edge of the center counterbore so that the forward face of the center plug forms a substantially uninterrupted continuation of the outer surface of the nose fairing.

3. A device according to claim 2 wherein the forward face of the center plug is dome-shaped.

4. In a rocket launcher having a body section provided with a plurality of axially extending parallel launcher tubes arranged in a circular pattern about the axial centerline of the body section and in which each tube is adapted to contain and launch rockets; the improvement comprising a nose fairing attached to and projecting beyond the forward end of the launcher body section and having a forwardly tapered outer surface, the fairing being provided with a plurality of coaxial bores and counterbores which in combination pass axially through it in the formation of rocket discharge channels; the bores rearwardly terminating adjacent to and in registration with the forward ends of the launcher tubes and forwardly opening into the counterbores at annular shoulders; the counterbores opening outwardly at their forward ends through the tapered surface of the body section; and plugs fitted within the counterbores and including squared-off rear faces abutting against the annular shoulders, cylindrical outer surfaces snugly but slidingly engaging the cylindrical inner surfaces of the counterbores and extending forwardly to the forward ends of the counterbores, and beveled forward faces inclined in substantially the same direction as the tapered outer surface of the fairing at the location where counterbores open outwardly through the outer surface so as to deflect the oncoming airstream outwardly; whereby when a rocket is ignited in a launcher tube the rocket's nose will engage the plug preceding it and push that plug out of its respective counterbore allowing the rocket to exit through its discharge channel.

5. A device according to claim 4 wherein each plug's leading edge defined by the intersection of the plug's cylindrical outer surface and beveled forward face is located adjacent the forward edge of its respective counterbore along that portion of the counterbore which is disposed outermost from the axial centerline of the nose fairing, so that the forward face of the plug forms a substantially uninterrupted continuation of the tapered outer surface of the fairing at that point.

6. A device according to claim 5 wherein the bevel of the forward face on each plug is less than the taper of the outer surface of the nose portion at the location where its counterbore opens outwardly through the tapered outer surface so that the plug's leading edge is presented rearwardly from the tapered outer surface along that portion of the counterbore located closest to the axial centerline of the nose fairing.

7. A device according to claim 6 wherein the forward faces of the plugs are planar.

References Cited

UNITED STATES PATENTS

| 2,931,273 | 5/1960 | Weatherhead | 89—1.817 |
|-----------|--------|-------------|----------|
| 3,342,104 | 9/1967 | Robert | 89—1.817 |
| 3,354,571 | 11/1967 | Parker | 102—95 |
| 3,106,863 | 10/1963 | Robert et al. | 89—1.817 |

FOREIGN PATENTS

| 88,739 | 7/1958 | Netherlands. |
| 972,555 | 10/1964 | Great Britain. |
| 1,291,667 | 3/1962 | France. |

SAMUEL W. ENGLE, Primary Examiner

U.S. Cl. X.R.

98—31

PO-1050
(5/69)

UNITED STATES PATENT OFFICE
CERTIFICATE OF CORRECTION

Patent No. 3,456,552          Dated July 22, 1969

Inventor(s) John J. Nash

It is certified that error appears in the above-identified patent and that said Letters Patent are hereby corrected as shown below:

Column 1, line 64, for "blast often" read -- blast itself often --; column 2, line 43, for "extendnig" read -- extending --; column 2, cancel lines 68, 69 and 70; column 3, line 44, for "are plurality" read -- are a plurality --; column 4, line 59, for "about the center" read -- about center --; column 5, line 9, for "descripion" read -- description --; column 6, line 23, for "of the plug's" read -- of that plug's --.

SIGNED AND
SEALED
MAR 24 1970

(SEAL)
Attest:

Edward M. Fletcher, Jr.
Attesting Officer

WILLIAM E. SCHUYLER, JR.
Commissioner of Patents